June 4, 1935. K. R. SHAW 2,004,085
MANUFACTURE OF RUBBER THREADS
Filed May 25, 1933 2 Sheets-Sheet 1
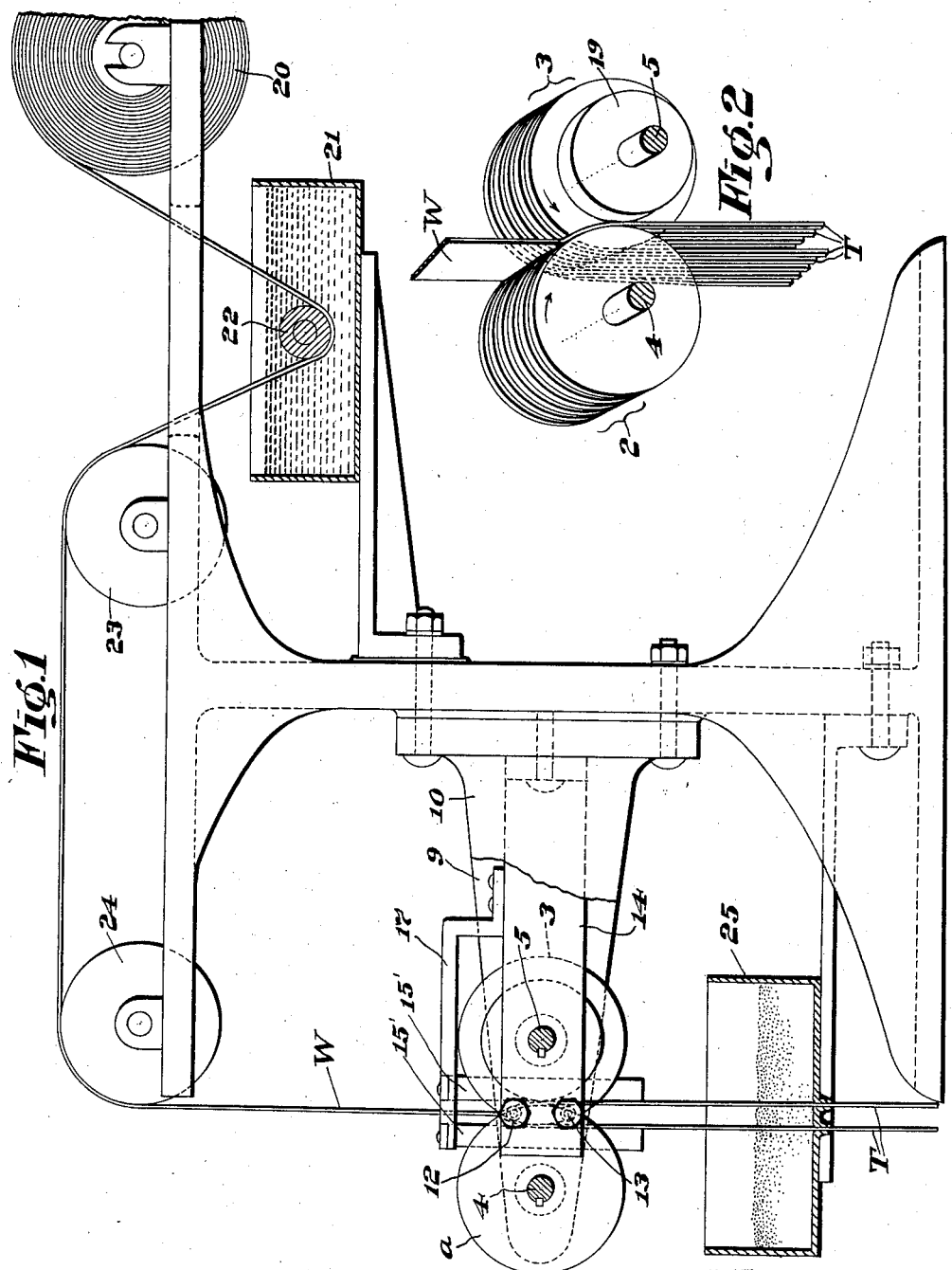

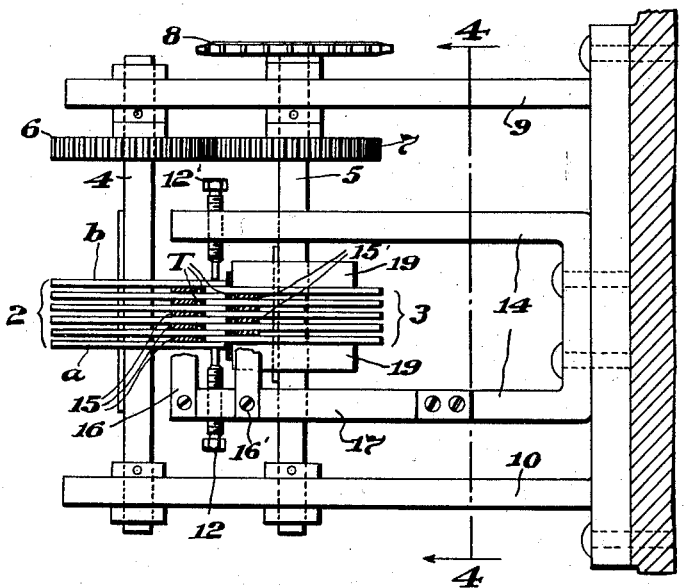
Fig.3
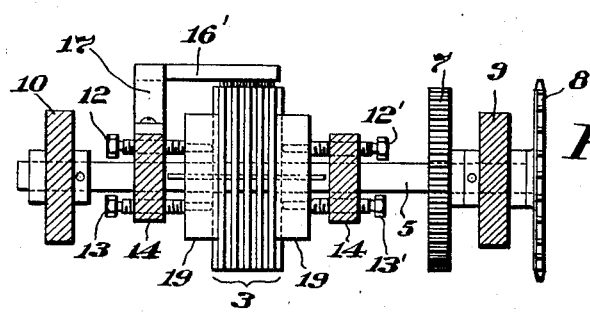
Fig.4
Fig.5
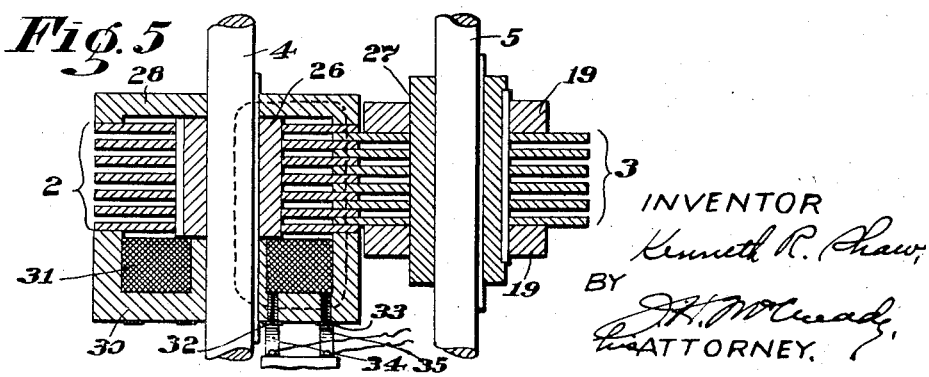
INVENTOR
Kenneth R. Shaw,
BY
ATTORNEY.

Patented June 4, 1935

2,004,085

UNITED STATES PATENT OFFICE 2,004,085

MANUFACTURE OF RUBBER THREADS

Kenneth R. Shaw, Easthampton, Mass., assignor to Easthampton Rubber Thread Co., Easthampton, Mass., a corporation of Massachusetts Application May 25, 1933, Serial No. 672,858

7 Claims. (Cl. 164—60)

This invention relates to the manufacture of rubber thread and it has for its general object to effect economies in this process.

The method of making rubber thread from calendered rubber in universal commercial use at the present time, so far as I have been able to learn, consists of winding a sheet of rubber on a drum and cutting simultaneously through all the plies or convolutions on the drum by means of a sharp edged rotary knife or cutter of the disk type, the cutter generally being fed longitudinally of the drum at a predetermined and fixed rate. The size of the thread so cut depends on the thickness of the rubber sheet and the rate of axial feed of the cutter.

A serious objection to this method is that no practical way has been devised for guiding the individual threads away from the cutting point without having them become entangled with adjacent threads. Consequently, it is necessary after the cutting operation has been completed to untangle the entire mass of cut threads. This operation must be performed by hand and it therefore adds materially to the expense of manufacture of the final product.

In addition, it is necessary, largely because of the nature of the action of the cutter on the rubber, to have the rubber vulcanized before the sheet or web is cut. Such a method also introduces difficulties in cutting fine numbers with the desired accuracy and produces a relatively high proportion of waste or scrap.

The present invention deals especially with these difficulties and it aims to devise a thoroughly practical solution for them. It is directed particularly to improvements in the manufacture of rubber thread designed to reduce the expense of manufacture and to effect a better control, both for the purpose of producing a more uniform product and also facilitating the cutting of finer threads.

The nature of the invention will be readily understood from the following description when read in connection with the accompanying drawings, and the novel features will be particularly pointed out in the appended claims.

In the drawings,

Figure 1 is a side elevation, with certain parts in section, of a machine embodying features of this invention;

Fig. 2 is a perspective view of the cutting disks of the machine shown in Fig. 1;

Fig. 3 is a plan view, partly in section, of the cutting or slitting unit of the machine shown in Fig. 1;

Fig. 4 is a vertical, sectional view on the line 4—4, Fig. 3; and

Fig. 5 is a horizontal, sectional view of a modification.

The present invention provides a process of making rubber thread which differs radically from that above described in that it proposes to cut a web of sheet rubber longitudinally into strips of the desired widths to form the threads instead of cutting the web while wound upon a drum. In addition, the rubber in the web at this time may either be vulcanized or unvulcanized, as desired. Preferably this operation is performed after the rubber has been compounded properly for vulcanization but while it is still in an unvulcanized state, vulcanization of the threads later being effected by floating it in hot water or by subjecting it to the action of steam or hot air, or in any other convenient manner. Due to the fact, however, that the rubber is in an uncured state when cut, the scrap or waste which inevitably is produced can be returned to the mills for re-working into sheets and its value thus can be recovered completely.

An important feature of the present invention resides in the slitting or cutting mechanism. As shown in the drawings, this mechanism comprises two parallel sets of rotary square-edged cutting disks designated at 2 and 3, respectively. These sets of disks are supported on parallel shafts 4 and 5, respectively, each disk being keyed to its respective shaft but otherwise being loosely mounted thereon. For the purpose of revolving these shafts in opposite directions and at the same speed, they have gears 6 and 7 secured to them which mesh with each other, the shaft 5 carrying a sprocket wheel 8 by means of which it may be connected to any convenient source of power. Rigid frame pieces 9 and 10 operatively support the shafts.

It should be observed that the individual disks of one set fit between, or are interleaved with, adjacent disks of the other set, as shown in Fig. 3. Also, that the disks of one set overlap those of the other, as clearly shown in Figs. 1, 2 and 3. Consequently, if a web of sheet material, such for example as paper, is fed between these disks in the manner illustrated in Fig. 2, and the disks are held in shearing relationship to each other, they will cut the web into a series of strips or strands. Slitting machines of this general type have been known heretofore, but so far as I have been able to learn they have never been so constructed that they could be used for cutting sheet rubber into narrow threads.

In order to adapt such a machine for making rubber thread I have found that it is extremely important to maintain the cutting edges of the disks constantly in accurate shearing relationship to each other. Moreover, even if such a relationship is established in the machine as originally set up, this relationship will be changed after a relatively short period of use due to the wear of the disks on each other. When this occurs a sharp edge is no longer produced on the rubber thread, and after a short period of further wear the rubber will become pinched between adjacent disks and the machine will jam. The better the grade of rubber used and the finer the threads produced, the more likely is such a jam to occur. I have found, however, that the desired relationship between the disks can be maintained by mounting them loosely on the shafts, as above described, so that they are free to move axially of the shafts, and then producing the necessary degree of pressure on the overlapping portions of the disk to hold all of the disks constantly in contact with each other.

In the machine shown this object is accomplished by arranging upper and lower thrust screws 12 and 13 where they will bear against the outmost disk a of the two series in the region where this disk overlies the next adjacent disk, and similarly locating a like pair of thrust screws 12' and 13' at the opposite end of the series of disks where they will bear against the outermost disk b, the two screws 12 and 12' being in axial alinement with each other and the same being true of the other pair of screws.

These thrust screws are supported in the legs of a supplemental U-shaped frame member 14. It will readily be seen from an inspection of Figs. 1 and 3 that the upper thrust screws 12 and 12' hold the disks constantly pressed together at what may be termed the "leading" portion of the overlapping area of the two sets of disks. This is the point where the cutting action occurs, as will be evident, and consequently, this is the region in which it is absolutely essential to have the edges of the two sets of disks held constantly in contact with each other. It is not so important that these members be pressed together at their "trailing" edges, or, in other words, at the points where they are leaving or passing out of contact with each other, but a better operating condition is maintained if they are also held in contact at the latter point. For this reason I prefer to arrange the screws as shown so that they will apply lateral pressure to the overlapping portions of the disk at both the upper and lower sides of the plane passing through the axes of the shafts 4 and 5, or, in other words, at both the leading and trailing regions above mentioned. By mounting the disks loosely on their shafts, as above described, their positions are controlled primarily by the thrust screws, and they can have a certain amount of freedom of movement or wabble on the shafts without affecting their cutting action.

With this arrangement, as the web W, Fig. 1, is fed between the disks it is cut longitudinally into strips which form the threads T. Any wear of the lateral or end faces of the disks which occurs can readily be taken up by suitable adjustment of the thrust screws. This adjustment to keep the overlapping portions of the two sets of disks in proper contact with each other, and the occasional grinding of the edges of the disks to keep them square and to maintain sharp edges at the junctions of the peripheral and end faces of the disks, are the chief factors in ensuring a clean cut.

The cross-sectional dimensions of the threads will depend upon the thickness of the web W and the thicknesses of the disks. These factors can easily be changed at will so that the machine lends itself readily to the manufacture of thread of any commercial size. Because of the control which it affords over the cutting operations, it is particularly useful in cutting the very fine numbers, such as eighties and above, which have recently come into considerable demand and which have heretofore generally been regarded as impossible to make by cutting.

As the individual threads are formed they move down between adjacent disks, as shown in Figs. 2 and 3, and there is, therefore, some tendency for the disks to pinch these threads laterally and to carry the threads around with them. For the purpose of preventing such action, a reed is provided having two rows of fingers 15 and 15' which project between the disks and serve to strip the threads from the disks. These fingers are secured rigidly to, or are formed integral with, bars 16 and 16', respectively, both mounted on a bracket 17 which is secured to the supplemental frame 14. Preferably two collars 19—19 are mounted on the shaft 5, which supports the smaller number of disks, and are secured adjustably to the shaft at the opposite ends of the set of cutting disks where they serve to guide the opposite marginal portions of the web which must necessarily be left uncut. It is important, however, to have these margins properly supported so that the web will be correctly guided through the slitting disks. These collars may be secured to the disks by set screws so that they can be conveniently moved or adjusted to the particular set of disks being used, it being contemplated that the disks will be changed, as above indicated, to suit the cross-sectional dimensions of the thread being cut.

The web of rubber to be cut may be conveniently brought to the machine in the form of a roll 20 wound upon a suitable arbor, and the machine is equipped with bearings designed to receive this arbor and to support the roll for unwinding. The cutting operation is facilitated very materially by having the web wet at the time it is cut, and consequently, the web is led from the roll 20 through a dip tank 21 containing a bath of water, with or without soap, as desired, and equipped with a guide roll 22. The water acts as a lubricant for the rubber during the cutting operation. From this bath the web runs over additional rolls 23 and 24 which guide it to the slitting mechanism. As the individual threads are discharged from the slitter they may be guided through holes in the bottom of a box 25 containing a quantity of talc or some equivalent material adapted to reduce the surface tackiness of the rubber and to make the product easier to handle. This is particularly desirable in the event that the rubber is slit while in an unvulcanized or uncured condition since it greatly facilitates the handling of the threads and the subsequent arrangement of them in hanks, or the winding of them on spools. Due to the fact that the slitting mechanism exerts a rather light drag or feeding effort, it may be desirable in some cases to revolve the supply roll 20 and possibly, also, the guide rolls 23 and 24, by power connections.

Instead of applying lateral pressure to the overlapping portions of the disks by means of thrust screws, as above described, such pressure can be exerted magnetically, and an arrangement embodying this idea is illustrated in Fig. 5. By reference to this figure it will be observed that the two sets of disks 2 and 3 are mounted on bushings 26 and 27, respectively, made of brass, bronze, or some other non-magnetic material, these bushings being keyed to the respective shafts 4 and 5 and the disks, in turn, being keyed to the bushings but freely slidable axially on the bushings. Also, mounted loosely on the shaft 4 are two iron collars or end pieces 28 and 30, respectively, and the latter collar is cored out or grooved to receive a magnetizing coil 31. The terminals for this coil are led through the end of the collar to slip rings 32 and 33 against which brushes 34 and 35 bear, respectively, to conduct current to the coil. The collars 19—19 which are mounted at the opposite ends of the set of disks 3 and which serve to support the uncut marginal portions of the rubber web should be made of non-magnetic material.

It will be observed that with this arrangement the magnetic field set up by the coil 31 is compelled to follow the path indicated by the dotted lines in Fig. 5. In other words, it flows through the shaft 4, collars 28 and 30 and through the overlapping portions of the disks, this being the path of least reluctance. Any stray lines of force which do not pass through the overlapping portions of the disks will be so scattering as to be entirely negligible. It is well known that any magnetic circuit exerts a strong tendency to shorten. This tendency, as exhibited in the present arrangement, will draw the collar 28 toward the opposite collar 30, thus pressing the overlapping portions of the disks together, and this tendency will be aided by the magnetic attraction of the overalpping portions of the disks for each other. The degree of pressure so applied to the disks or cutters can be accurately controlled by properly designing the magnetizing coil 31 in accordance with well known electro-magnetic laws.

This arrangement, therefore, provides a smoother running construction than that in which the thrust screws are used, requires no adjustment to compensate for wear, and maintains a more constant and better operating condition, in addition to reducing the wear on the disks. The arrangement in which the thrust screws are used is, however, an entirely practical construction. In both of these arrangements a localized pressure is maintained on the overlapping portions of the disks serving to press said portions laterally together and thereby to hold the edges of the disks in shearing relationship to each other.

When the electro-magnetic arrangement is used, the reeds and any spacing washers used should be made of non-magnetic metal. While the fact that the margins of the disks are moving through a magnetic field tends to create eddy currents in the disk, and thus to produce heat in them, it is entirely feasible to make the magnetic field of such an intensity and to hold the operating speeds within such limits that excessive heating will be avoided.

It has been definitely demonstrated in actual practice that this invention effects a substantial economy in the manufacture of rubber thread. In addition, it produces a more uniform product. A further advantage of this process when it is carried out without vulcanizing the sheet prior to cutting, is that the thread does not have the customary cloth marks which is a common characteristic of prior cut rubber threads, and which is caused by the fact that the web is wrapped in a cloth during vulcanization. A still further advantage of this process over the prior commercial processes is that the lengths of the cut threads which can be made by the latter are very limited, whereas according to the present process, threads may be made in lengths practically as long as may be desired.

While I have herein shown and described the embodiment of my invention at present preferred, it will be evident that the invention may be embodied in other forms without departing from the spirit or scope thereof.

Having thus described my invention, what I desire to claim as new is:

1. In a machine for cutting a web of rubber to produce rubber threads, two sets of cutting disks, two parallel shafts on which said sets of disks, respectively, are supported with the individual disks of one set in overlapping relationship to and interleaved between those of the other set, the opposite sides of each disk of one set being in contact with the sides of two disks of the other set, mechanism for revolving said shafts to rotate the two sets of disks in opposite directions, means bearing against the overlapping portions of said disks to press said portions laterally together and thereby to hold the edges of said disks in shearing relationship to each other, means for guiding a web of sheet rubber between said disks to cause them to cut said web longitudinally into threads, and a reed having members projecting between adjacent disks of the two sets to strip the threads from the disks.

2. In a machine for cutting a web of rubber to produce rubber threads, two sets of cutting disks, two parallel shafts on which said sets of disks, respectively, are supported with the individual disks of one set in overlapping relationship to and interleaved between those of the other set, mechanism for revolving said shafts to rotate the two sets of disks in opposite directions, and devices for applying lateral pressure to the overlapping portions of said disks at opposite sides of the plane passing through both axes of said shafts to hold the edges of said disks in shearing relationship to each other.

3. In a machine for cutting a web of rubber to produce rubber threads, two sets of cutting disks, two parallel shafts on which said sets of disks, respectively, are supported with the individual disks of one set in overlapping relationship to and interleaved between those of the other set, mechanism for revolving said shafts to rotate the two sets of disks in opposite directions, and magnetic means for pressing the overlapping portions of said disks together.

4. In a machine for cutting a web of rubber to produce rubber threads, two sets of cutting disks, two parallel shafts on which said sets of disks, respectively, are supported with the individual disks of one set in overlapping relationship to and interleaved between those of the other set, mechanism for revolving said shafts to rotate the two sets of disks in opposite directions, and electro-magnetic means associated with one of said sets of disks for creating a magnetic circuit through the overlapping portions of the two sets of disks to press said portions of the disks laterally together and thereby to hold the edges of the disks in shearing relationship to each other.

5. In a machine for cutting a web of rubber to produce rubber threads, two sets of cutting disks supported in parallel relationship to each other with the individual disks of one set fitting between and overlapping adjacent disks of the other set, the opposite sides of each disk of one set bearing against the sides of the two disks of the other set at opposite sides of it, mechanism for revolving the two sets of disks, means for acting substantially in line with the intersection of the leading edges of the overlapping portions of said disks to apply pressure at said intersection to force said leading edges laterally together and thereby to hold said edges in shearing relationship to each other, said means being adjustable to vary the lateral pressure so applied to said disks, and means for guiding a web of sheet rubber between said disks to cause the disks to cut said web longitudinally into threads.

6. In a machine for cutting a web of rubber to produce rubber threads, the combination of two sets of cutting disks, two parallel rotary shafts on which said sets of disks, respectively, are mounted, with the individual disks of one set in overlapping relationship to and interleaved between those of the other set, the opposite faces of each disk of one set being in contact with the faces of two disks of the other set, means for guiding a web of rubber between said disks to cause them to cut said web longitudinally into threads, and members located between adjacent disks of the two sets and serving to strip the threads from the disks.

7. In a machine for cutting a web of rubber to produce rubber threads, the combination of two sets of cutting disks, two parallel rotary shafts on which said sets of disks, respectively, are mounted, with the individual disks of one set in overlapping relationshiip to and interleaved between those of the other set, the opposite faces of each disk of one set being in contact with the faces of two disks of the other set, means for guiding a web of rubber between said disks to cause them to cut said web longitudinally into threads, means for pressing the leading edges of the overlapped portions of said disks laterally together to hold said edges constantly in shearing relationship to each other, and additional means extending between the disks for stripping the threads from them.

KENNETH R. SHAW.